United States Patent [19]
Sallee et al.

[11] Patent Number: 5,216,979
[45] Date of Patent: Jun. 8, 1993

[54] TOILET BOWL MOUNTABLE TRAP DOOR CAT LITTER BOX

[76] Inventors: Earnest W. Sallee, 18333 Roehampton, #427, Dallas, Tex. 75252; Michael W. Freitas, 1006 San Jacinto, #514, Irving, Tex. 75063

[21] Appl. No.: 695,723
[22] Filed: May 6, 1991
[51] Int. Cl.$^5$ .............................. A01K 29/00
[52] U.S. Cl. .......................... 119/162; 4/239
[58] Field of Search ............ 119/161, 162, 165, 163, 119/169, 170; 4/300.3, 238, 239, 315

[56] References Cited

U.S. PATENT DOCUMENTS

| | | | |
|---|---|---|---|
| 2,053,594 | 9/1936 | Albert | 119/162 |
| 2,584,656 | 2/1952 | Anderson . | |
| 3,601,093 | 8/1971 | Cohen | 119/162 |
| 3,656,457 | 4/1972 | Houston | 119/162 |
| 3,688,742 | 9/1972 | McGee . | |
| 3,757,738 | 9/1973 | Hall . | |
| 3,949,429 | 4/1976 | Hall . | |
| 4,181,096 | 1/1980 | Grubman | 119/162 |
| 4,437,430 | 3/1984 | DeBardelebes . | |
| 4,477,932 | 10/1984 | Lenosky | 4/239 |
| 4,748,700 | 6/1988 | Wooten . | |

FOREIGN PATENT DOCUMENTS

| | | | |
|---|---|---|---|
| 1198638 | 12/1985 | Canada | 119/165 |
| 2741562 | 3/1979 | Fed. Rep. of Germany | 119/162 |
| 3028579 | 2/1982 | Fed. Rep. of Germany | 119/166 |
| 3627570 | 2/1988 | Fed. Rep. of Germany | 119/162 |

*Primary Examiner*—Gene Mancene
*Assistant Examiner*—Todd E. Manahan
*Attorney, Agent, or Firm*—Warren H. Kintzinger

[57] ABSTRACT

A portable cat litter box adjustably mountable on a toilet bowl is provided with the litter box equipped with a trap door and trap door opening mechanism for dumping litter from the box directly into a toilet bowl for ease of litter disposal. A pull member connected to the trap door is moveable from a forward trap door closed position to a pulled out trap door opened position tilted downward from a rear pivot mount structure. Opposite side slotted cam guide structure for the trap door opening and closing are mounted on the bottom of the cat litter box with rod segments mounted on a back and forth trap door movement structure and extended into the oposite side cam guides.

5 Claims, 6 Drawing Sheets

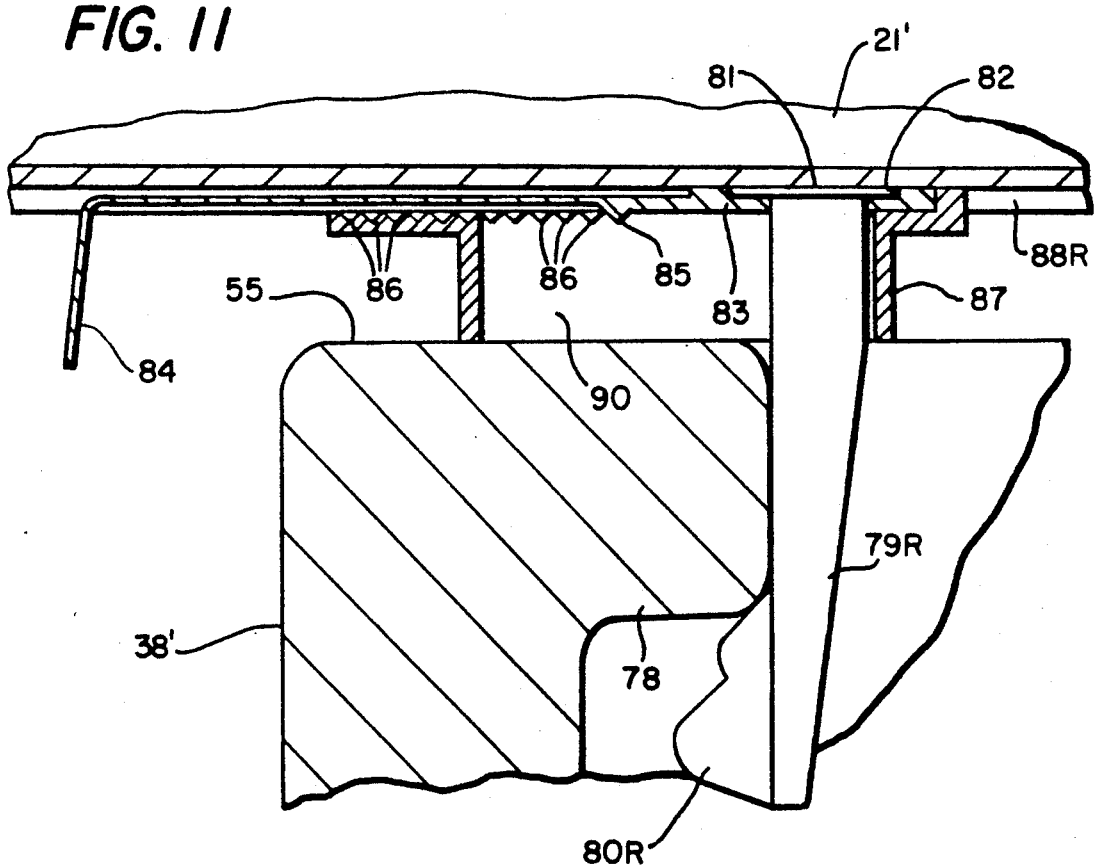

TOILET BOWL MOUNTABLE TRAP DOOR CAT LITTER BOX

This invention relates in general to portable cat litter boxes, and more particularly, to an opening and closing trap door equipped cat litter box mountable on and adjustable to various toilet bowls at locations of convenience for cats when mounted on a toilet bowl.

BACKGROUND OF THE INVENTION

The cat litter box is useable on a toilet bowl but also a litter box standing on the floor and after use placeable on a toilet bowl for disposing of cat waste into a toilet bowl. Cats and other animals in the pet category have a tendency to relieve themselves out of doors, on lawns, flower beds, streets and sidewalks with the resulting unsatisfactory conditions annoying and inconveniencing many people. Housing in urban areas has been changing with a trend from free standing houses surrounded by lawns and gardens to apartments with little if any attached lawn space. Cats have been provided with indoor facilities such as a pan containing absorbent material, i.e. cat litter boxes, unsatisfactory in some respects such as expense, odor and with repeated frequent clean up being imposed. Animals generally continue to deposit wastes on the surface of the ground with it being an inherited trait to cover their own faces with dirt. Man is now trying to clean up after animals, an unpleasant task, getting rid of collected excretement by, among various disposal approaches, throwing it into a sewage system via a toilet.

FIELD OF THE INVENTION

It is therefore a principal object of this invention to provide a toilet bowl mountable cat litter making follow clean up optiminally efficient.

Another object is to provide such a cat litter box useable standing on the floor and mounted in place on a toilet bowl.

A further object is to provide such a cat litter box capable of dumping used litter from the box directly into a toilet bowl.

Still another object is to minimize if not eliminate human handling of used cat litter and to eliminate dipping of cat waste from a cat litter box.

SUMMARY OF THE INVENTION

Features of the invention in accomplishing the above objects include, in a toilet bowl mountable trap door equipped cat litter box, a portable cat litter box adjustably mountable on a toilet bowl with the litter box having a litter containing well opening bottomed with a trap door. Opening and closing mechanism is provided for the trap door for dumping litter and animal waste from the litter containing well of the box directly into a toilet bowl for ease of sanitary litter disposal. A pull member connected to the trap door is moveable from a forward trap door closed position to a pulled out trap door opened position tilted downward from a rear pivot mount structure. With one embodiment opposite side slotted cam guides for the trap door opening and closing structure are mounted on the bottom of a cat litter box with rod segments mounted on a back and forth trap door movement structure extended into the opposite side cam guides.

Specific embodiments representing what are presently regarded as the best mode of carrying out the invention are illustrated in the accompanying drawings.

BRIEF DESCRIPTION OF THE DRAWINGS

In the drawings:

FIG. 11, a cut away view along line 11—11 of FIG. 9 of an adjustable position ratchet bracket as adjustably positioned for the mounting of a cat litter box on a toilet bowl.

DESCRIPTION OF THE PREFERRED EMBODIMENT

Figure 1:
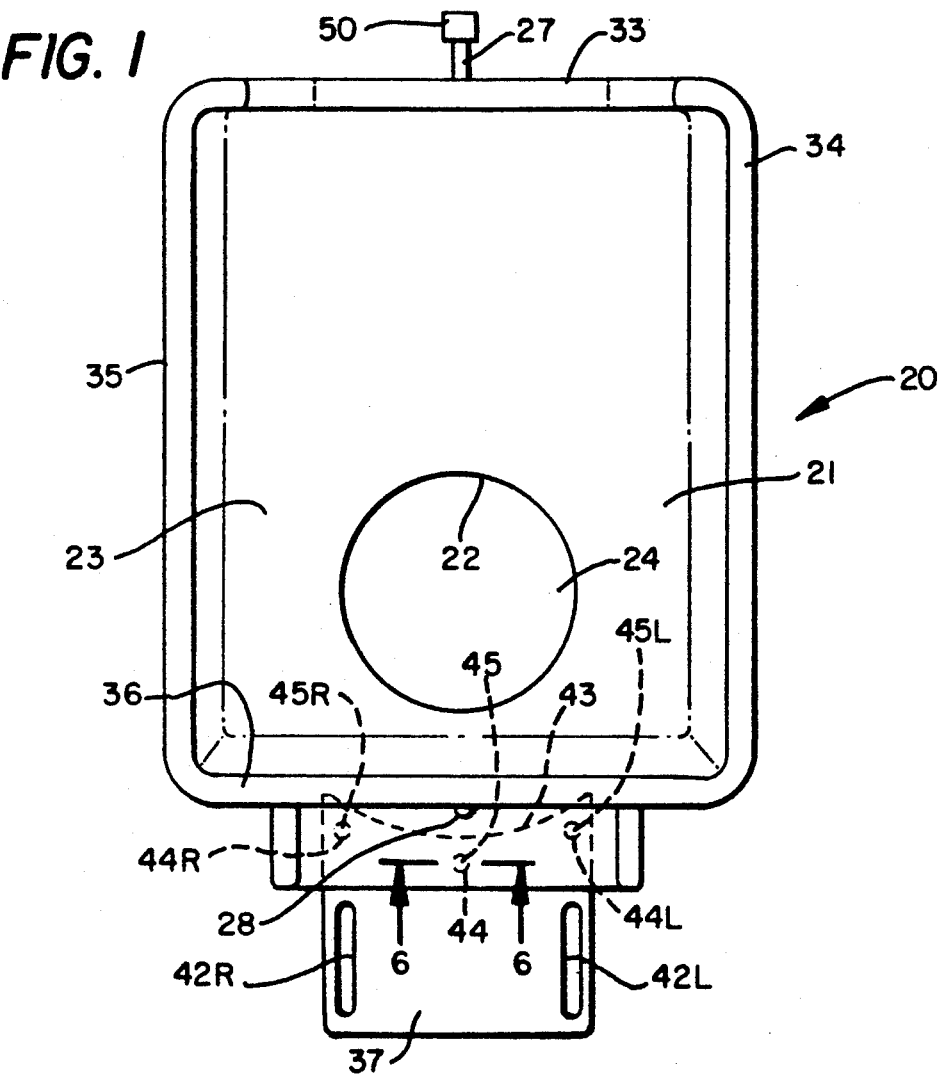
FIG. 1 represents a top plan view of a cat litter box with a mounting bracket.
Figure 2:
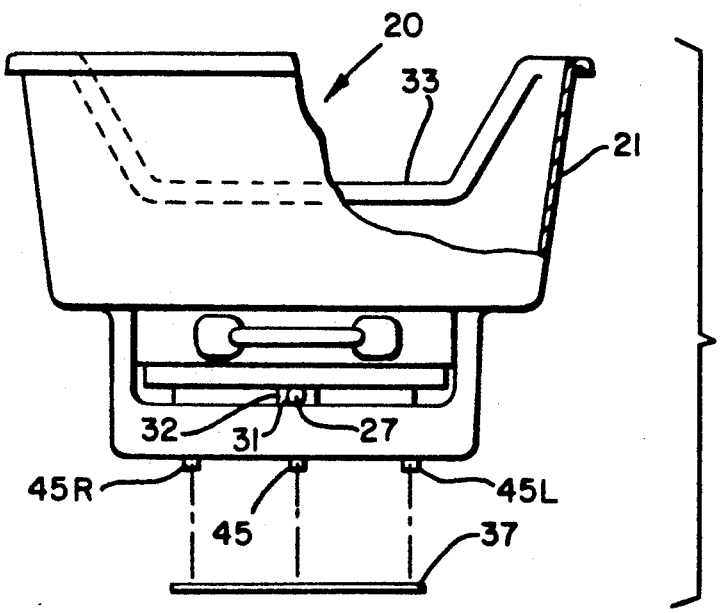
FIG. 2, a partially cut away and sectioned back elevation view of the cat litter box with the mounting bracket lowered from the box.
Figure 3:
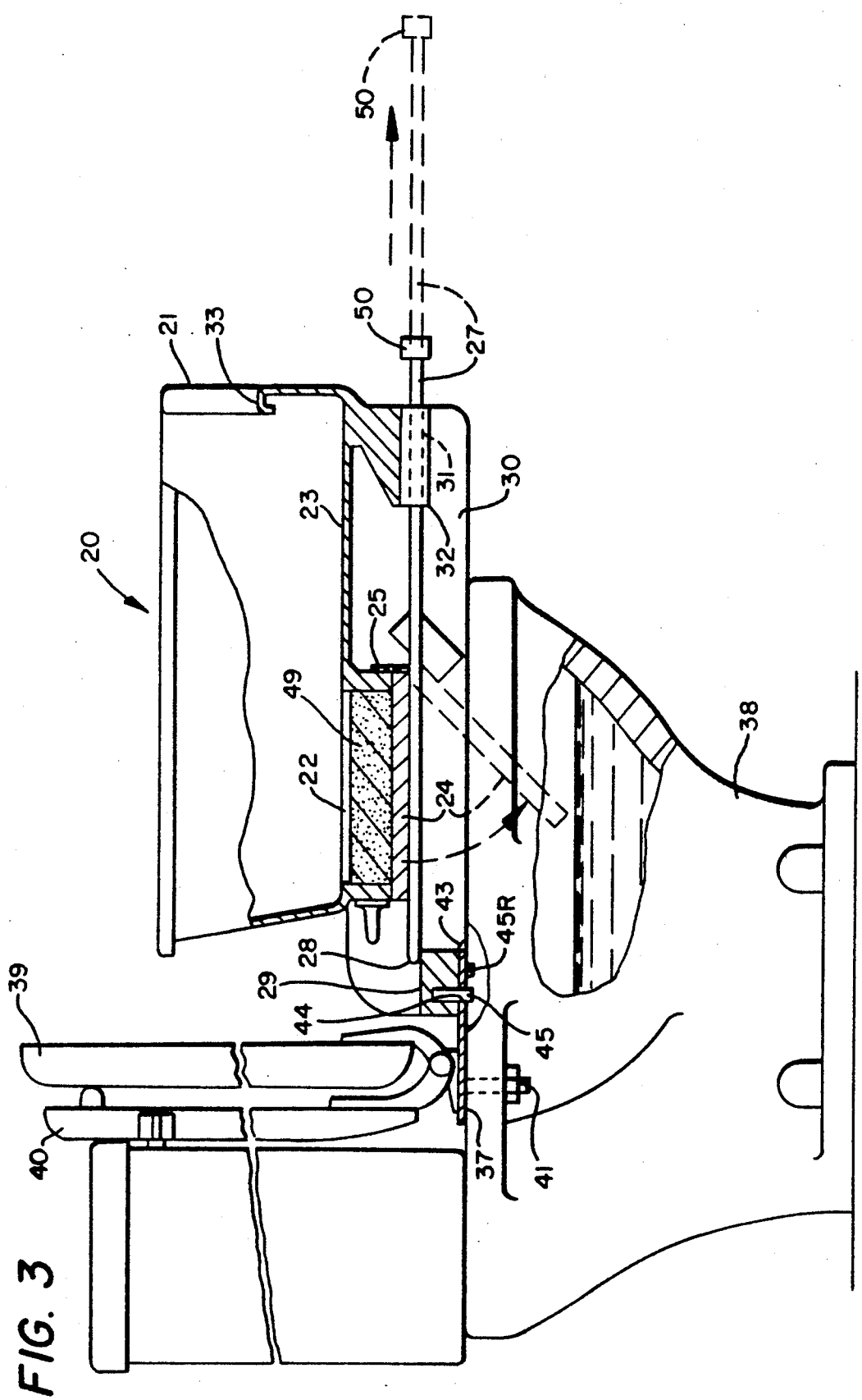
FIG. 3, a broken away and sectioned side elevation view of the cat litter box mounted in place on the bowl of a toilet.
Figure 4:
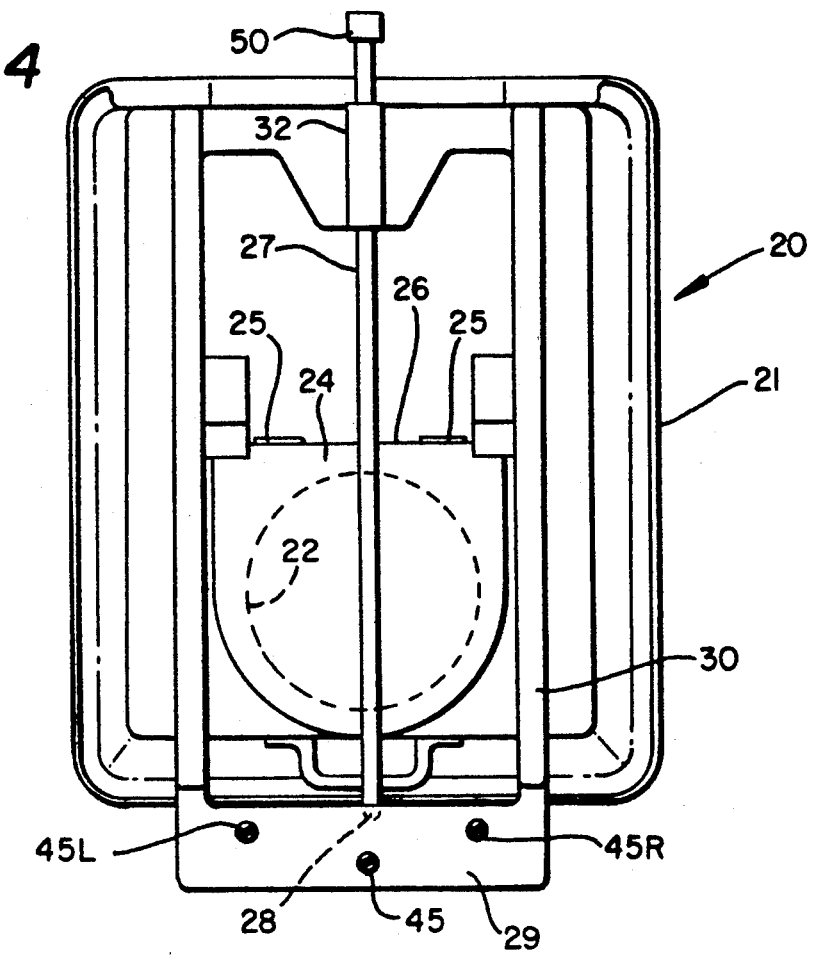
FIG. 4, a bottom plan view of the cat litter box.
Figure 5:
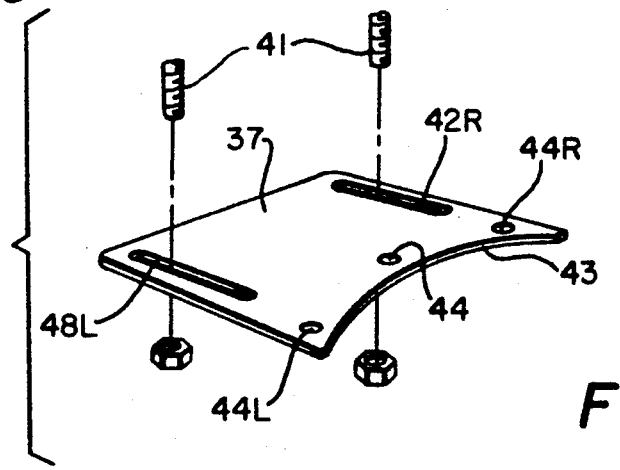
FIG. 5, an exploded view of the mounting bracket and bolts for the cat litter box of FIGS. 1-4.
Figure 6:
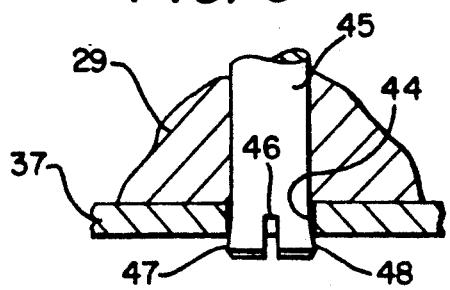
FIG. 6, a view taken along line 6—6 of FIG. 1 showing cat litter box mounting plate and pin detail.

The cat litter box 20 of FIGS. 1-6 is shown to be a rectangular pan 21, molded of plastic, having a lower depending circular well portion 22 in the rear of the bottom 23 of the rectangular pan 21. A trap door 24 is mounted by hinges 25 on a straight transverse forward wall 26 of the well portion subject to opening by the forces of gravity when trap door positioning rod 27 is pulled from a trap door closed state outward to the open state indicated in phantom in FIG. 3. The trap door positioning rod 27 is shown to have a rounded rear end 28 that when positioned in the rearward most trap door closed state rests on the top of transverse member 29 of the cat litter box bottom mounting structure 30. Rod 27 is mounted in and slidable back and forth through elongate rod opening 31 in box bottom boss 32. The rectangular pan 21 has a lowered forward entrance edge 33 for ease of cat entry when jumping therein and full height opposite side edges 34 and 35 and rear edge 36. Mounting plate 37 for the cat litter box 20 is mounted in place on a toilet bowl 38 by the toilet seat and lid mounting bolts 41 extended through parallel opposite side slots 42L and 42R that provide for position adjustment of the mounting plate 37 which is left in place hidden under the toilet seat 39 and lid 40 when the seat is in the lowered state. Mounting plate 37 has a curved cut away front edge 43, matching curvature of the overlying toilet seat 39, and has three mounting pin openings 44, 44R and 44L that receive, respectively, cat litter box mounting and positioning pins 45, 45R and 45L mounted in and extending downward from transverse member 29 of mounting structure 30. It is of interest to note that the bottom of pin 45 has a slot 46 so that opposite sides 47 and 48 of the pin (mirror images of each other) can resiliently snap outward as a snap in place fitting through opening 44 in mounting plate 37. Cat litter 49 is placed in circular well portion 22 filling the well up to within approximately some quarter of an inch to one half inch from the top. This volume of cat litter is a relatively small amount of litter 49 which is dumped into the toilet bowl 38 each time the trap door 24 is opened by grasping rod knob 50 and pulling the rod 27 out to the trap door 24 open state as shown in phantom in FIG. 3.

Figure 7:
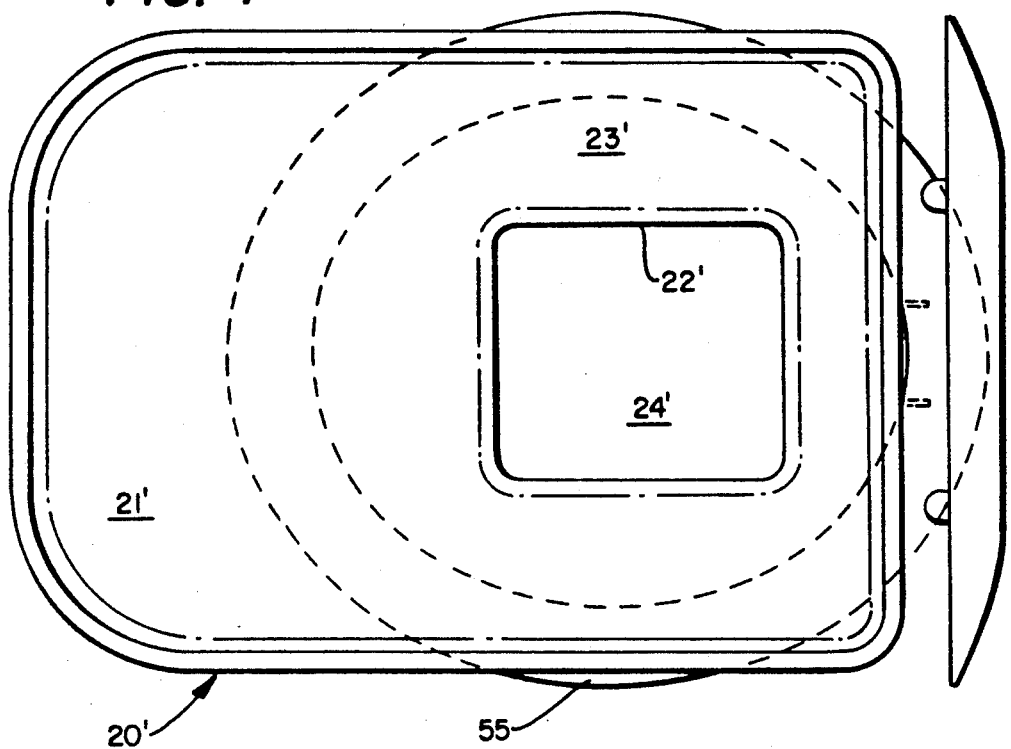
FIG. 7, a top plan view of another cat litter box embodiment mounted in place on a toilet bowl.
Figure 8:
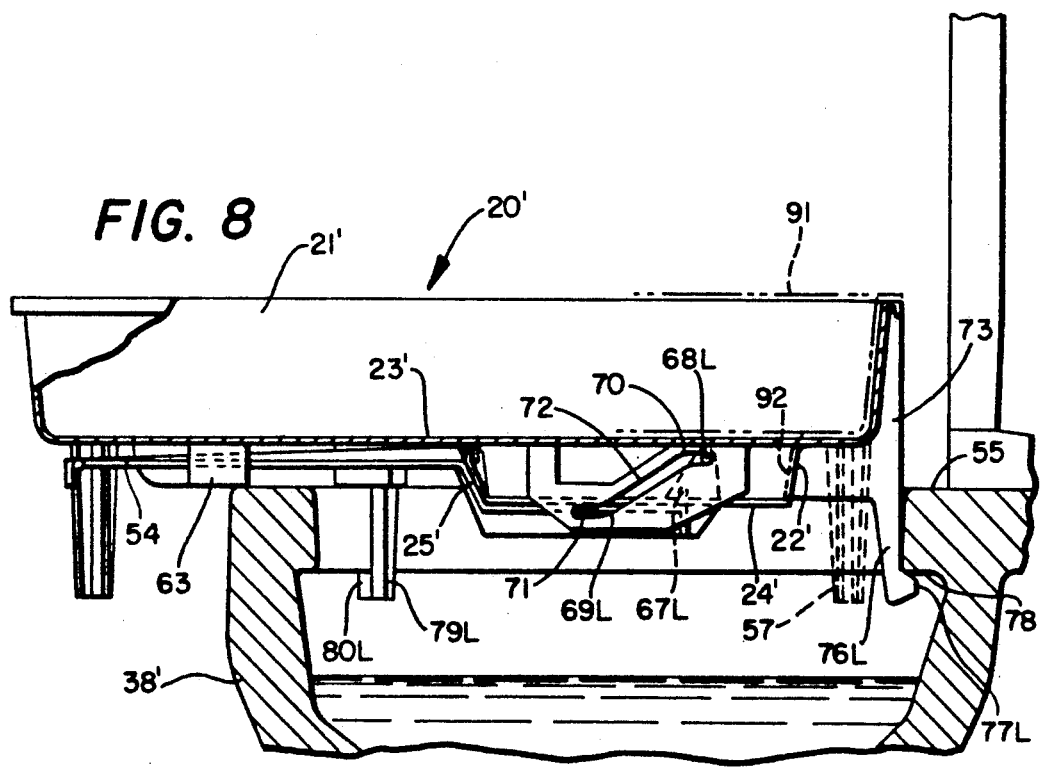
FIG. 8, a partial cut away and sectioned side elevation view of the cat litter box of FIG. 7, mounted on a toilet bowl.
Figure 9:
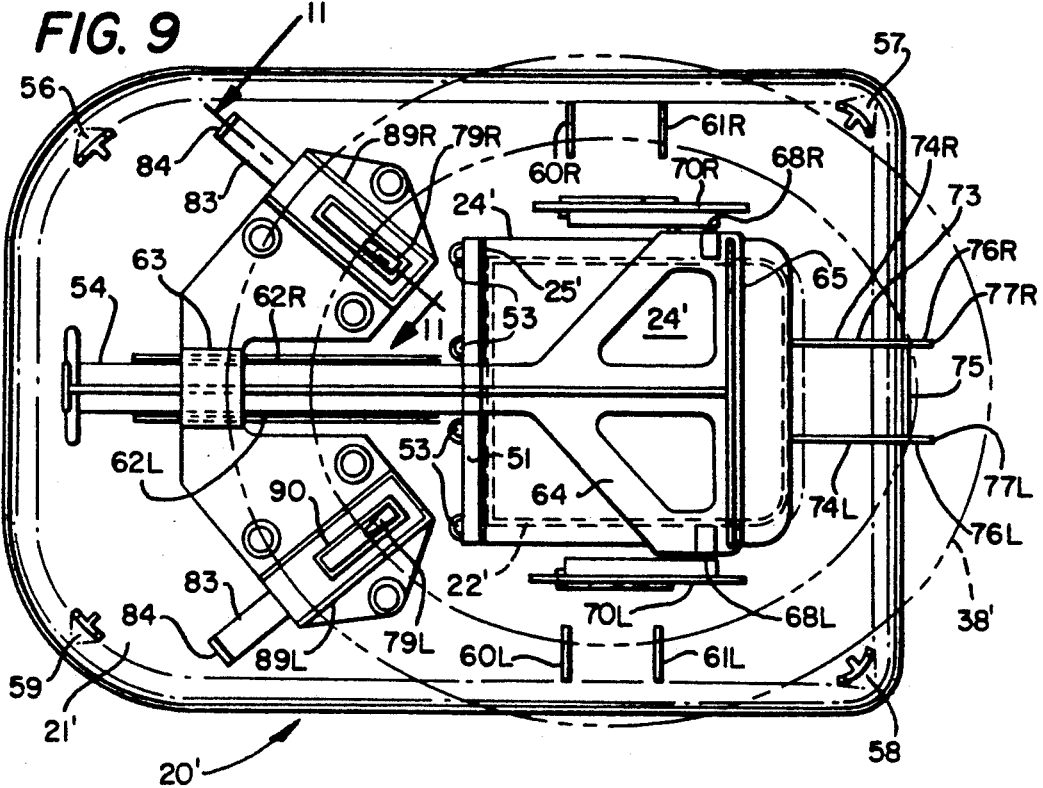
FIG. 9, a bottom plan view of the cat litter box of FIGS. 7 and 8.
Figure 10:
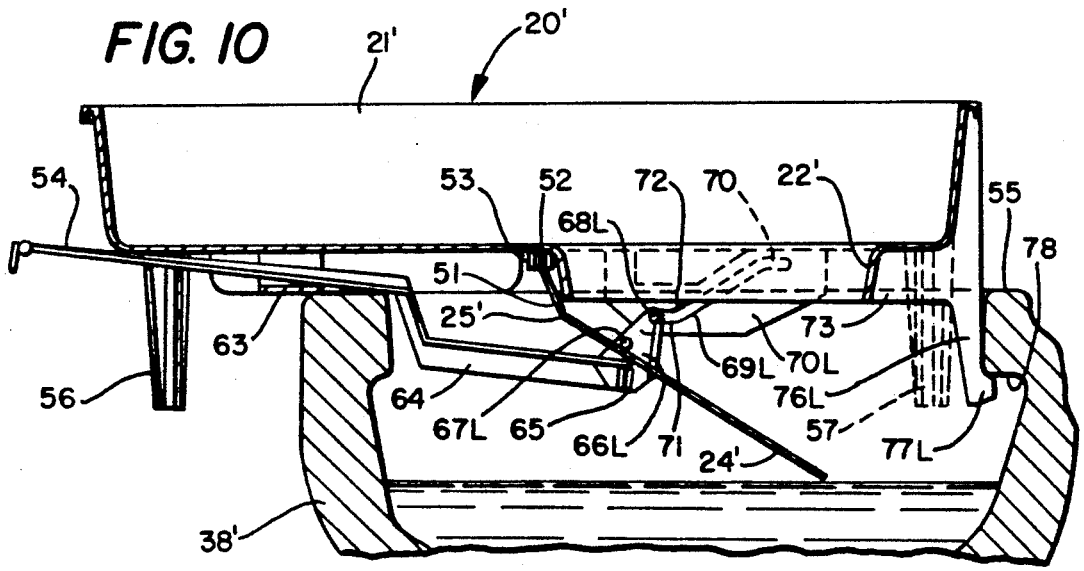
FIG. 10, a partial cut away and sectioned side elevation view of the cat litter box like the showing of FIG. 8 except that the trap door opening and closing member is pulled out to the open state from the closed state of FIG. 8.

The cat litter box 20' embodiment of FIGS. 7-11 is also shown to be, generally, a rectangular pan 21', molded of plastic, having a lower depending rectangular well portion 22' in rear of the bottom 23' of the rectangular pan 21'. A rectangular trap door 24' is mounted by a plastic tranverse flex hinge 25' that is thinner than the plastic mount extension 51 and the rectangular sheet of plastic forming the trap door 24' itself. The plastic mount extension 51 extends through aligned slots 52 in mount members 53 fastened to the bottom of the pan 21'. The trap door 24' opening and closing positioning structure also includes a trap door bracket lever 54 moveable from an inner trap door closed position to an outer open position shown in FIG. 10.

The cat litter box 20' is placeable on the top 55 of a toilet bowl 38' and also has four corner legs 56, 57, 58 and 59 for placing the box 20' on the floor or other flat surface. The four corner legs 56, 57, 58 and 59 are positioned such that they clear the outside of the top 55 of the toilet bowl 38' when placed thereon. Opposite side bottom webs 60L, 61L, 60R and 61R rest on the toilet bowl top 55 along with the forward bottom spaced parallel webs 62L and 62R and also cross bracket 63 mounted with webs 62L and 62 R on the bottom of the box 20'. Cross bracket 63 is a guide permitting articulation of the trap door bracket lever 54 in its movement from the trap door closed state of FIGS. 8 and 9 to the open state of FIG. 10. The forward end of bracket lever 54 under trap door 24' is in the form of a transversly widened head 64 having a forward transverse edge 65 and opposite side upwardly extended brackets including left bracket 66L and a right hand bracket mounting short inwardly extended pins 67L and 67R that along with edge 65 act as a guide for the trap door 24' through its range of opening and closing movement. Pins 67L and to a right hand pin overlie the edges of trap door 24' which are extended beyond the opposite sides of the rectangular well portion 22'. The opposite side upwardly extended brackets 66L and 66R also mount outwardly extended cam following pins 68L and 68R that extend into and ride along cam grooves 69L and a right hand groove in opposite side cam brackets 70L and 70R that extend downwardly from their mountings to the bottom of the pan 21'. Cam grooves 69L and 69R each have an upper rear end portion 70 and a lower forward end portion 71 that are joined by intermediate slanted portion 72 to guide positioning of the trap door 24' from the closed state to the open state and back again to the closed state.

At the rearward center portion of the cat litter box 20' there is a bracket 73 having spaced parallel side walls 74L and 74R joined by an interconnecting wall 75. The walls 74L and 74R have downward fixed position extensions 76L and 76R with bottom rearwardly directed projections 77L and 77R extended below the lip 78 of the toilet bowl top 55. Toward the front of cat litter box 20', forward from rectangular well portion 22', adjustable position downwardly extended latch extensions 79L and 79R have toilet bowl rim lip 78 facing and engaging latch projections 80L and 80R. The latch extensions 79L and 79R each have a rectangular flanged top 81 contained in a rectangular opening 82 in a pull bracket 83 with an outer end handle 84 and a bottom position locking detent 85 that is adjustably positionable in any one of a series of detent grooves 86 in bracket channel cover 87. A left channel and right channel 88R that guide pull brackets 83 in their adjustment movements at forty five degree angles right and left from opposite sides of the axis of lever 54 are formed in bracket members 89L and 89R fastened to the forward half of the bottom 23' of rectangular pan 21'. The bracket channel covers 87 are bonded in place over channels 88L and 88R and have elongate slots 90 through which latch extensions 79L and 79R extend throughout their full range of back and forth adjustment positioning.

Please note that the animal litter box 20' can include a pan liner 91 fitted to the pan 21' with the pan liner 91 having a depending well opening skirt 92.

Whereas this invention has been described with respect to several embodiments thereof, it should be realized that various changes may be made without departure from the essential contributions to the art made by the teachings hereof.

We claim:

1. An animal litter box, with a trap door, mountable on a toiled bowl comprising: a generally elongate animal litter box having sidewall means and a bottom; mounting means for mounting of the animal litter box on top of a toilet bowl; a sidewalled well opening with significantly smaller cross sectional area than the bottom of said litter box depending from the animal litter box for holding litter and waste from an animal using the litter box; an opening and closing trap door means on said sidewalled well opening mounted with hinge means to the bottom of said animal litter box; and single trap door opening and closing means mounted on said animal litter box and connected to said trap door means for opening and closing of the trap door means to dump litter and animal waste from said sidewalled well opening directly into the toiled bowl when opened and to retain litter placed in said sidewalled well opening when said trap door means is closed; wherein said sidewalled well opening and said trap door opening and closing means are mounted under a forward portion of said animal litter box; said trap door opening and closing means includes a manual pull member extending from said trap door means to beneath a forward portion of said animal litter box; wherein said manual pull member is a trap door bracket lever moveable from an inner trap door means closed position to an outer trap door means opening position; said sidewalled well opening is a rectangular opening with parallel opposite side walls and parallel front and back walls; said trap door means includes a hinge mounted rectangular trap door member which is wider than, and extends beyond, said parallel opposite side walls; said trap door bracket lever has a transversly widened head with a forward transverse edge and upwardly extended brackets on opposite sides thereof, and short inwardly extended pins mounted on said brackets that together with said transverse edge act as a guide for said trap door through a range of opening and closing movement; said opposite side upwardly extended brackets mounting outwardly extended cam following pins; and opposite side cam slot means engaged by said cam following pins for guiding said bracket lever and said trap door through its range of opening and closing movement.

2. The animal litter box, with a trap door, mountable on a toilet bowl of claim 1, wherein said trap door member is mounted by a plastic transverse flex hinge as hinge means mounting said trap door member to the bottom of said animal litter box.

3. An animal litter box, with a trap door, mountable on a toilet bowl comprising: a generally elongate litter box having side wall means and a bottom; nounting means for mounting of the animal litter box on top of a toilet bowl; a sidewalled well opening with significantly smaller cross sectional area than the bottom of said litter box depending from the animal litter box for holding litter and waste from an animal using the litter box; an opening and closing trap door means on said sidewalled well opening mounted with hinge means to the bottom of said animal litter box; and single trap door means opening and closing means mounted on said animal litter box and connected to said trap door means for opening and closing of the trap door means to dump litter and animal waste from said sidewalled well opening directly into the toilet bowl when opened and retain litter placed in said sidewalled well opening when said trap door is closed; wherein said sidewalled well opening and said trap door opening and closing means are mounted beneath a forward portion of said animal litter box; adjustable mounting means is provided for adjusting back and forth movement through a range of position settings for mounting said litter box on top of a toilet bowl; said adjustable mounting means is a mounting plate mounted in place on a toilet bowl by bolts that are the toilet seat mounting bolts; said mounting plate having parallel opposite side slots through which said seat mounting bolts extend with the slots providing said range of position settings; said mounting plate including a plurality of mounting pin openings; said animal litter box includes mounting structure means under said animal litter box bottom; and a plurality of mounting pins in said mounting structure means positioned for mounting insertion in said plurality of mounting pin openings in said mounting plate.

4. The animal litter box, with a trap door, mountable on a toilet bowl of claim 3, wherein at least one of said plurality of mounting pins has a slotted bottom for opposite pin slot sides to resiliently snap outward as a snap in place fitting through an opening of said plurality of mounting pin openings.

5. The animal litter box, with a trap door, mountable on a toilet bowl of claim 3, wherein said mounting plate has a curved edge matching curvature of the toilet seat such that a left in place mounting plate is generally hidden under the toilet seat when the seat is is in the lowered state.

* * * * *